United States Patent
Swift et al.

(10) Patent No.: US 7,925,576 B2
(45) Date of Patent: Apr. 12, 2011

(54) SYSTEMS FOR PROCESSING TRANSPONDER-BASED TRANSACTIONS

(75) Inventors: Amy Swift, Albuquerque, NM (US);
Lisa Tidwell, Houston, TX (US);
Cassandra Mollett, Houston, TX (US)

(73) Assignees: First Data Corporation, Greenwood Village, CO (US); The Western Union Company, Englewood, CO (US)

( * ) Notice: Subject to any disclaimer, the term of this patent is extended or adjusted under 35 U.S.C. 154(b) by 1471 days.

(21) Appl. No.: 10/184,033

(22) Filed: Jun. 26, 2002

(65) Prior Publication Data

US 2003/0187796 A1 Oct. 2, 2003

Related U.S. Application Data

(60) Provisional application No. 60/367,698, filed on Mar. 26, 2002.

(51) Int. Cl.
*G06Q 40/00* (2006.01)
(52) U.S. Cl. .............. 705/38; 705/35; 705/39; 705/45
(58) Field of Classification Search ............ 705/14–39, 705/45; 235/379–382
See application file for complete search history.

(56) References Cited

U.S. PATENT DOCUMENTS

| | | | |
|---|---|---|---|
| 5,101,200 A * | 3/1992 | Swett ........................ 340/937 |
| 5,175,682 A | 12/1992 | Higashiyama et al. |
| 5,231,569 A * | 7/1993 | Myatt et al. ................. 705/38 |
| 5,237,159 A * | 8/1993 | Stephens et al. ............ 705/30 |
| 5,265,007 A * | 11/1993 | Barnhard et al. ........... 705/45 |
| 5,371,798 A | 12/1994 | McWhortor |
| 5,484,988 A | 1/1996 | Hills et al. |
| 5,679,938 A * | 10/1997 | Templeton et al. ......... 235/379 |
| 5,679,940 A | 10/1997 | Templeton et al. |
| 5,811,771 A | 9/1998 | Dethloff |
| 5,924,737 A * | 7/1999 | Schrupp ....................... 283/58 |
| 5,930,777 A | 7/1999 | Barber |
| 5,991,749 A | 11/1999 | Morrill, Jr. |
| 6,073,840 A | 6/2000 | Marion |
| 6,089,284 A | 7/2000 | Kaehler et al. |
| 6,119,105 A | 9/2000 | Williams |
| 6,122,625 A | 9/2000 | Rosen |
| 6,158,657 A | 12/2000 | Hall, III et al. |
| 6,230,148 B1 | 5/2001 | Pare, Jr. et al. |
| 6,305,603 B1 | 10/2001 | Grunbok, Jr. et al. |
| 6,356,752 B1 | 3/2002 | Griffith |

(Continued)

FOREIGN PATENT DOCUMENTS

WO    WO 99/08238   *   2/1999

(Continued)

OTHER PUBLICATIONS

Biometric Access Corporation Press Release, Feb. 15, 2001.

(Continued)

*Primary Examiner* — Kambiz Abdi
*Assistant Examiner* — Sarah M Monfeldt
(74) *Attorney, Agent, or Firm* — Kilpatrick Townsend & Stockton LLP

(57) ABSTRACT

The present invention includes transaction processing systems that process transactions from merchant systems designed to convert the presentation of a transponder device into electronic debits from a checking account. The transaction processing systems also can provide risk assessment, validation or user data and/or MICR data, and/or transaction guarantee services.

23 Claims, 5 Drawing Sheets

U.S. PATENT DOCUMENTS

| | | | |
|---|---|---|---|
| 6,505,772 | B1 | 1/2003 | Mollett et al. |
| 6,529,725 | B1 | 3/2003 | Joao et al. |
| 6,547,132 | B1 | 4/2003 | Templeton et al. |
| 6,581,042 | B2 | 6/2003 | Pare, Jr. et al. |
| 6,581,043 | B1 | 6/2003 | Wallin et al. |
| 6,609,095 | B1 | 8/2003 | Krause |
| 6,609,905 | B2 | 8/2003 | Eroglu et al. |
| 6,728,686 | B2 | 4/2004 | Kasai et al. |
| 6,757,664 | B1 * | 6/2004 | Cardinal et al. ............... 705/38 |
| 6,783,065 | B2 * | 8/2004 | Spitz et al. ................. 235/380 |
| 6,950,810 | B2 * | 9/2005 | Lapsley et al. ............... 705/78 |
| 7,012,547 | B2 | 3/2006 | Hassett |
| 7,027,890 | B2 * | 4/2006 | Wilson .................. 700/232 |
| 7,051,001 | B1 * | 5/2006 | Slater ...................... 705/39 |
| 7,131,571 | B2 | 11/2006 | Swift et al. |
| 7,350,697 | B2 | 4/2008 | Swift et al. |
| 7,406,442 | B1 * | 7/2008 | Kottmeier et al. ............ 705/35 |
| 2001/0044764 | A1 | 11/2001 | Arnold |
| 2002/0022966 | A1 * | 2/2002 | Horgan ....................... 705/1 |
| 2002/0099649 | A1 * | 7/2002 | Lee et al. ................... 705/38 |
| 2002/0120846 | A1 | 8/2002 | Stewart et al. |
| 2002/0152123 | A1 * | 10/2002 | Giordano et al. ............. 705/14 |
| 2002/0156723 | A1 * | 10/2002 | Lilly et al. ................. 705/38 |
| 2002/0178063 | A1 | 11/2002 | Gravelle et al. |
| 2003/0093367 | A1 | 5/2003 | Allen-Rouman et al. |
| 2003/0093368 | A1 | 5/2003 | Manfre |
| 2003/0126017 | A1 | 7/2003 | Rau et al. |
| 2003/0128866 | A1 | 7/2003 | McNeal |
| 2003/0222135 | A1 | 12/2003 | Stoutenburg et al. |
| 2005/0071283 | A1 * | 3/2005 | Randle et al. ................ 705/75 |
| 2005/0097037 | A1 | 5/2005 | Tibor |

FOREIGN PATENT DOCUMENTS

| | | | |
|---|---|---|---|
| WO | WO 01/41355 | * | 6/2001 |
| WO | WO 01/97134 A1 | | 12/2001 |
| WO | WO 03/042790 A2 | | 5/2003 |
| WO | WO 03/083751 A1 | | 10/2003 |

OTHER PUBLICATIONS

Bischoff, Laura A., "Will that be cash or finger?", Dayton Daily News, Feb. 21, 2001.
SmartTouch Press Release, Jan. 18, 2000.
Veristar Corporation Press Release, Jun. 30, 2000.
VeristarCorp.com Web Pages (obtained via WaybackMachine.org Internet Archive), Copyright 2000.
"Security and Convenience at your Fingertips," Jun. 1999.
Giovetti, Alfred, Profit and Loss, accounting software; Evaluation, May 1992, Compute!. vol. 14, No. 4, p. 1-3.

* cited by examiner

SYSTEMS FOR PROCESSING TRANSPONDER-BASED TRANSACTIONS

REFERENCE TO RELATED APPLICATIONS

The present application claims priority benefit under 35 U.S.C. §119(e) from U.S. Provisional Application No. 60/367,698, filed Mar. 26, 2002, entitled "Alternative Debit Devices Using Electronic Check Processing As A Payment Mechanism," which is incorporated herein by reference.

FIELD OF THE INVENTION

The present invention relates to the field of electronic commercial transactions. More specifically, the invention relates to electronic check processing systems which process transactions from transponder devices presented as payment for goods or services.

BACKGROUND OF THE INVENTION

Consumers and merchants in today's marketplace have access to a wide variety of technologies for extending credit or otherwise transferring monies for goods or services ("products"). For example, consumer and merchants use traditional debit technologies such as paper checks. A check refers to a draft or order for a certain sum of money payable on demand to a certain named entity, the entity's order, or to the bearer thereof. Generally, the face of a check includes magnetic ink character recognition ("MICR") characters that can be read electronically. The MICR characters typically include a checking account number, the bank transit number, the check sequence number, and the like. In addition, the MICR characters may indicate whether the check is a company check or a personal check. The form or font of the MICR characters and their position along the bottom edge of the check are generally prescribed by standards promulgated by the American National Standards Institute ("ANSI"), which are incorporated by reference herein.

Paper checks are generally processed through clearinghouse ("ACH") networks, which can include some or all banks, clearinghouse corporations, the Federal Reserve bank, or the like. For example, a payor, or check writer, may authorize an originator, such as a grocery store, to debit the payor's checking account by writing a check for, for example, groceries. The originator forwards the authorization to an originating depository financial institution ("ODFI"), such as the grocer's bank. The ODFI sends the authorization through the ACH network to a receiving depository financial institution ("RDFI"), such as the payor's bank. The RDFI then can transfer funds by debiting the payor's checking account and sending a credit through the ACH network to the ODFI, or grocer's bank.

To avoid many drawbacks associated with the foregoing paper check processing, such as processing delays measured in many days and sometimes in one or more weeks, ACH networks now provide for electronic check processing. For example, merchants can now have personal checks converted to electronic ACH debits, often by scanning in paper check data at the point-of-sale, and returning the paper copy of the check to the consumer. The paper check data generally includes data representing the MICR characters, an amount, a payee, a scan of one or both sides of the paper check, and the like. As can be expected, the electronic ACH debits can be processed at much greater speeds due at least in part to the lack of paper handling that will occur. Moreover, some banks are processing a day's electronic items prior to processing the day's paper items.

The decreased processing delays associated with the electronic ACH debits often advantageously provide more consistent deposit patterns back to merchants and decrease the delay in discovering and stopping the use of fraudulent checks. Additionally, as discussed in the foregoing, electronic ACH debits also advantageously allow merchants to immediately return the paper check to the customer.

Other technologies available to consumers and merchants in today's marketplace include traditional credit and debit card technologies. While these traditional card technologies enjoy wide acceptance as a method of paying for products both in modern online and traditional paper processing environments, they have significant drawbacks for consumers and for merchants. For example, as compared with the banking population, a much smaller percentage of consumers have or use one or more credit or debit cards. Moreover, the issuer of card technologies often charges high interest rates to the consumer, while also charging high fixed or high variable processing fees to merchants. The high rates often render smaller incremental charges via traditional card technologies impractical. Also, more and more consumers are unable or unwilling to pay down their debt, so they resort to revolving that debt from one credit card to the next. In addition to the foregoing, traditional card technologies can be subject to fraud, fines, or the like.

Still other technologies available today include modem payment technologies, such as, convenience or loyalty cards, radio frequency payment devices such as Easypay, Speedpass, Fastpay, toll road transponders, or the like. Generally, a consumer first enrolls in a payment technology with a merchant or a gateway service. During enrollment, the consumer often provides a credit or debit card account from which debits will be made. The merchant then issues, for example, the payment device to the consumer. When the consumer desires to purchase products from the merchant, the consumer presents the payment device to, for example, a receiver device designed to communicate with the payment device so as to uniquely identify the consumer's associated credit or debit card account. The merchant then bills the consumer's card for the purchase of the products.

The foregoing payment technologies are finding wider acceptance among consumers as the payment technologies often provide a very convenient payment mechanism, and are finding wider acceptance among merchants as payment technologies often generate consumer loyalty. However, because the foregoing payment technologies often employ traditional card technologies as the backend payment mechanism, these payment technologies unfortunately assume many or all of the foregoing drawbacks associated with the traditional card technologies, including, for example, the inability to practically service smaller, incremental-type charges.

SUMMARY OF THE INVENTION

Based at least in part on the foregoing drawbacks, a need exists for transaction processing system that allows consumers to use modem payment technologies without incorporating the drawbacks of traditional credit or debit card technologies. One embodiment of the invention includes a transaction processing system that converts a transaction produced from virtually any payment device or technology, into electronic debits processed through clearinghouse systems as traditional electronic ACH debits to a checking account. Thus, the transaction processing system advantageously avoids the negative drawbacks of traditional credit or debit card technologies while incorporating the advantages of electronic ACH debit processing. Moreover, by using a checking account for the debit, the transaction processing system advantageously uses the most prevalent financial account found in the U.S. population. According to some embodiments, the transaction processing system also provides for the guarantee of payment to the merchant or retailer initiating the transactions.

According to one embodiment, the transaction processing system includes a merchant system, a transaction processor, an automated clearinghouse system and a user account. The transaction processor accepts enrollment transaction requests from merchant systems seeking to issue a payment device to a new user, where the payment device is other than a paper check and designed to access debit funds in the user's checking account. For example, the payment device can include cards, transponders, biometric elements, or the like. During enrollment processing, the transaction processor accepts user data, MICR data, the check number, and the like. The transaction processor also accepts a transaction date and merchant data, such as a merchant's identification number or other data.

According to one embodiment, the transaction processor processes enrollment transaction requests by validating some or all of the user data, by clearing some or all of the user data through negative and/or positive databases, assessing a risk score to the enrollment transaction using, for example, a variety of payor historical payment variables as well as variables associated with typical transactions in that standard industry code (SIC—a four digit code often used to denote differing specific industries), validating MICR data through ACH processing, or the like. The transaction processor returns a result of the enrollment transaction to the merchant. According to one embodiment, the result can include advice on whether to an accept or decline the user, an assessed risk score associated with enrolling the user, a result of a negative and/or positive database search, some or all of the same, or the like.

According to another embodiment, the transaction processor also accepts purchase transaction requests from merchant systems that have recognized a payment device presented by a user as payment for a product. For example, the merchant system can associate a presented payment device with a unique user account directing the merchant to withdraw funds to cover payment from the user's checking account. The merchant system organizes the information into a purchase transaction request and forwards the same to the transaction processor. During the processing of purchase transactions, the transaction processor accepts data, such as some or all of the foregoing user data, some or all of the foregoing MICR data, some or all of the foregoing merchant data, or the like. The transaction processor also accepts specific transaction data such as the date, time or amount of the transaction, the product information involved in the transaction, and the like. The transaction processor also submits one or more electronic ACH debits representing the transaction to the clearinghouse system.

Moreover, in an embodiment, the transaction processor processes purchase transaction requests by validating some or all of the submitted user data, by clearing some or all of the user data through negative and/or positive databases, by assessing a risk score to the enrollment transaction, by settling the transaction through electronic ACH debit processing, and the like. The transaction processor returns an authorization result of the payment transaction to the merchant. For example, the result can include advice on whether to accept or decline the purchase transaction based on an assessed risk score associated with transaction, a result of a negative and/or positive database search, some or all of the same, or the like.

In one embodiment, the merchant may manage the payment device, such as a proprietary loyalty card, thereby allowing the users to purchase products at the merchant's retail locations using the payment device. Additionally, according to at least one embodiment, a "gateway" can act as an aggregator of services and provide multiple merchants with the ability to allow payment through the gateway's payment device. For example, the gateway may allow users to purchase products at, for example, many differing merchants' retail locations using the same payment device.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

DETAILED DESCRIPTION OF THE PREFERRED EMBODIMENTS

Figure 1:
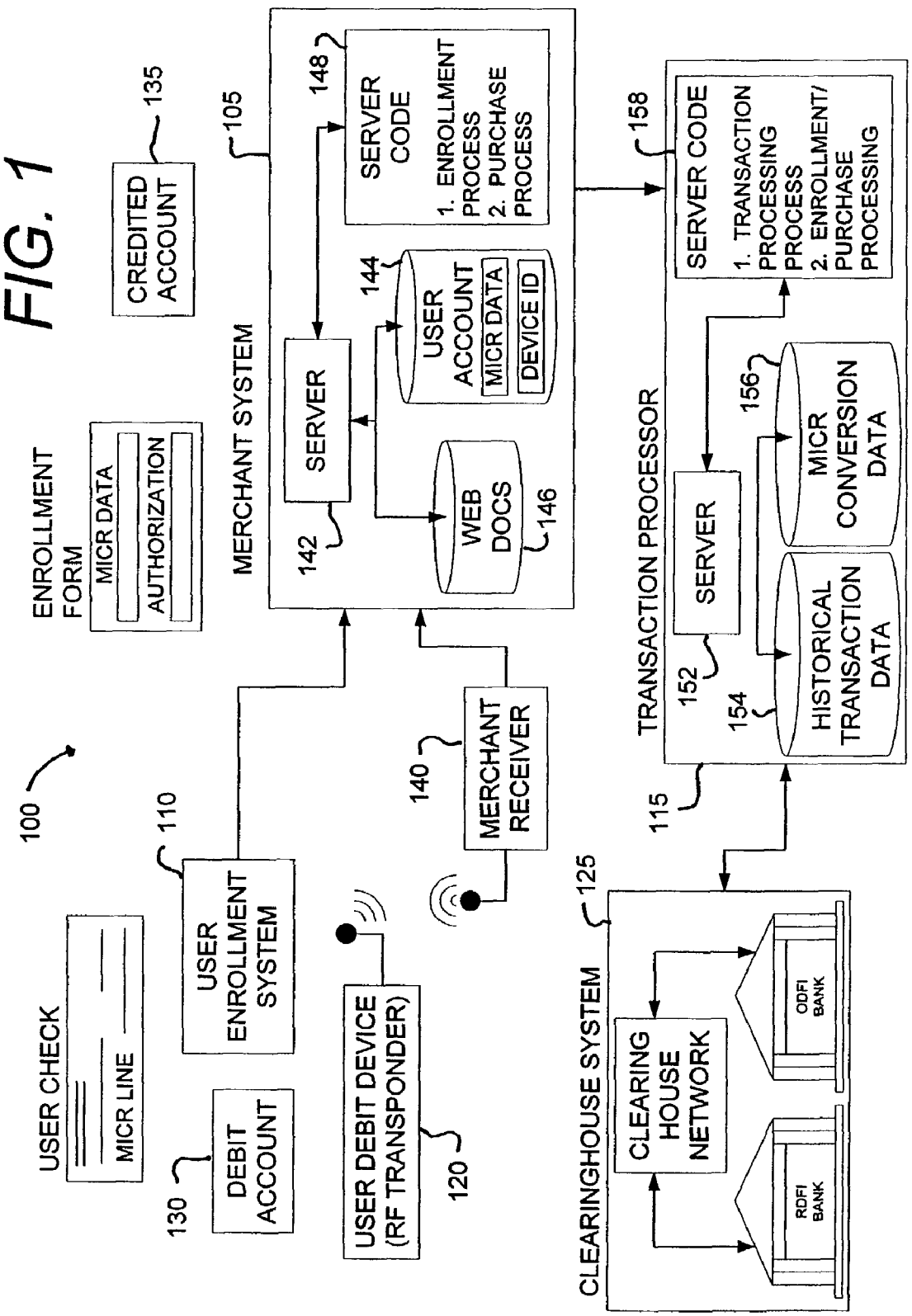
FIG. 1 illustrates a diagrammatic representation of an exemplary transaction processing system which allows a user to present payment technologies other than checks or credit cards and have payment extracted from a debit account, according to an embodiment of the invention.

A transaction processing system converts the presentation of virtually any payment device or technology, into electronic debits to a checking account processed through a clearinghouse system. Thus, the transaction processing system advantageously avoids the negative drawbacks of traditional credit or debit card technologies while incorporating the advantages of electronic debit processing. Moreover, by using a checking account, the transaction processing system uses the most prevalent financial account found in the banking population.

As will be apparent, many of the disclosed features may be used without others, and may be implemented differently than described herein. Further, although described primarily in the context of a transponder based system, the various inventive features are also applicable to types of alternative payment devices other than paper checks or credit or debit cards, including, but not limited to loyalty cards, electronic wallets, one or more smart cards, one or more biometric elements such as a thumbprint or facial recognition, other point-of-sale payment devices, or the like. The following description is thus intended to illustrate, and not limit, the invention.

According to one embodiment, the transaction processing system includes a merchant system, a transaction processor, a user payment device, a clearinghouse system, and a user debit account. The transaction processor accepts enrollment transaction requests from merchant systems seeking to issue a payment device to a new user, such as a potential payor, where the payment device is other than a paper check and designed to access debit funds in the user's debit account, such as a checking account. For example, the user can include an individual consumer attempting to make a financial transaction. The payment device can comprise a convenience or loyalty card, a transponder, such as radio or other frequency transponder, an electronic wallet, one or more smart cards, one or more biometric elements such as a thumbprint or facial recognition, other point-of-sale payment devices, or the like. During enrollment processing, the transaction processor accepts user data, such as driver's license number or other identification information, demographic information such as name, address, birth date, telephone number, social security number, or the like, one or more biometric measurements, passwords, or the like. The transaction processor also accepts MICR data such as scanned or manually entered MICR characters from an unused paper check of the user, the check number, or the like. The transaction processor also accepts a transaction time, place and date, and merchant data, such as a merchant's identification number, location, or other data.

Enrollment Transactions

According to one embodiment, the transaction processor processes enrollment transaction requests depending upon services generally chosen by the submitting merchant. For example, a merchant may chose to have some or all of the user data validated. According to one embodiment, the transaction processor can determine whether user data, such as, for example, driver's license information, driver's license information, MICR data, or the like match those contained in one or more databases accessible to the transaction processor. For example, the transaction processor may access a wide number of sources, including credit agencies, online information or databases, public records, or the like. According to one embodiment, some or all of the user data, social security number, MICR data, or the like is provided by the user during enrollment.

According to one embodiment, a merchant may also choose to have the transaction processor clear some or all of the user data through negative and/or positive databases. For example, the transaction processor can compare the user's name, driver's license information, or other demographic information to a database of known high risk (negative databases) or known low risk (positive databases) data. When a match is found in the negative databases and the merchant desires that the transaction processor guarantee future transactions associated with the enrolling user, the transaction processor may inform the merchant system to decline enrollment to the user. Alternatively, when the processor is not acting as a guarantor, the transaction processor may return information informing the merchant of, for example, a negative database match.

A merchant may also choose to have the transaction processor assess a risk score for the enrollment transaction. As in known in the art, assessing a risk score can advantageously include predictive modeling systems that analyze a plurality of relevant variables in order to determine the probability of a particular transaction being good or bad, such as the probability the transaction will or will not clear the banking system via clearinghouse processing.

Credit risk scoring algorithms generally take into account those pieces of available data that have been determined to be statistically significant. The risk score may be a normalized value that indicates the probability that the transaction will be good. If the merchant desires that the transaction processor guarantee future transactions associated with the enrolling user as well as process the transaction, the transaction processor may simply advise the merchant whether to decline enrollment to the user based on, for example, whether the risk score meets a predetermined threshold. Alternatively, if the transaction processor is not acting as a guarantor, the transaction processor may compare a merchant's "score card," which includes predetermined values below which the merchant and/or the processor agree, the risk of loss is acceptable to the merchant. Otherwise, the transaction processor may simply return the risk score to the merchant system. Although risk scoring algorithms are known in general, it will be appreciated that the details of most algorithms, including the specific data considered and the weight given various data, are considered proprietary by their owners.

The merchant may also choose to have the transaction processor validate any ACH processing data. According to one embodiment, the transaction processor can perform a validation transaction where a user's checking account is debited and credited for, for example, an equal amount. The result of such debiting and crediting can be reported through, for example, settlement files similar to those to be discussed with reference to purchase transactions. The foregoing validation transactions ensure that the user's account and the associated banking institutions are compatible with the processing of electronic ACH debits.

Purchase Transactions

According to another embodiment, the transaction processor also accepts purchase transaction requests from merchant systems that have recognized a payment device presented by a user as payment for a product. The merchant system associates the device with a unique account directing the merchant to withdraw funds to cover payment from the user's debit account. During purchase processing, the transaction processor accepts data, such as some or all of the foregoing user data, some or all of the foregoing MICR data, some or all of the foregoing merchant data, or the like. The transaction processor also accepts data related to the specific transaction, such as product information, amount of purchase, time of day, day of week, date, location of purchase, purchaser, cash back amount, type of payment device, and the like. The transaction processor also organizes and submits one or more electronic ACH debits associated with the transaction to the clearinghouse system.

Moreover, in an embodiment similar to that disclosed with reference to enrollment transaction requests, the transaction processor processes transaction requests by validating some or all of the submitted user data, by clearing some or all of the user data through negative and/or positive databases, by assessing a risk score to the enrollment transaction, by settlement through electronic ACH debit processing, or the like. The transaction processor returns an authorization result of the purchase transaction to the merchant. As disclosed in the foregoing, the format and content of various information within the authorization result may depend on whether the transaction processor will act as a guarantor for the payment transaction. As disclosed, the authorization result can include advice or instructions on whether to an accept or decline the purchase transaction, a risk score to inform the merchant of a risk associated with accepting the transaction, a result of a negative and/or database search, or the like.

When the transaction processor processes purchase transaction requests that include settlement, the transaction processor can send a report, often in the form of a settlement file, to the merchant. For example, when the transaction processor processes one or more (e.g., a batch of) transactions, the transaction processor may send a preliminary settlement report which is often subject to reversal. Similar to paper check processing, electronic check processing often assumes that transactions are settled, but then reverses a transaction when debits and/or credits fail during processing by a clearinghouse system, such as the ACH. The foregoing settlement file may be sent after one or more transactions have been processed, one or more batches of transactions have been processed, one or more transaction or batches of transactions have been processed for a given merchant, some time delay after processing, or the like. Moreover, the settlement file may be sent at intervals of time, at the end of each day, week, or the like. An artisan will recognize from the disclosure herein, that when the transaction processor acts as a guarantor for a transaction, the data related to that transaction in the settlement file is often then not subject to reversal because the risk of a failed settlement has been transferred to the transaction processor.

Thus, the foregoing transaction processing system advantageously allows the association of a merchant's payment device to a user's checking account. The transaction processing system provides for enrollment of the user and the processing of purchase transactions. During enrollment and purchase transaction request processing, the transaction processor can perform various services, often chosen through preexisting agreements with merchants, such as user data validation, negative and positive database searching, risk assessments, validation or settlement processing, or the like.

To facilitate a complete understanding of the invention, the remainder of the detailed description describes the invention with reference to the drawings, wherein like reference numbers are referenced with like numerals throughout.

FIG. 1 illustrates a diagrammatic representation of an exemplary embodiment of a transaction processing system 100 which processes transactions for merchants associated with payment technologies that debit funds of, for example, a user's checking account. As shown in FIG. 1, the transaction processing system 100 includes a merchant system 105 designed to communicate with a user enrollment system 110, a transaction processor 115, and a user payment device 120. FIG. 1 also shows the transaction processor 115 communicating with a clearinghouse system 125. According to one embodiment, at least the merchant system 105, the user enrollment system 110, the transaction processor 115, and the clearinghouse system 125 communicate with one another through one or more communication links.

As disclosed in the foregoing, the user enrollment system 110 communicates with the merchant system 105 to enroll users into modem payment technologies. The modem payment technologies avoid the drawbacks of traditional credit or debit card technologies by associating a debit account 130, such as a checking account, with the user payment device 120. During enrollment, the user uses the enrollment system 110 to submit various information to the merchant system 105. The merchant system 105 organizes the information into an enrollment transaction request and submits the enrollment transaction request to the transaction processor 115. The transaction processor 115 performs various merchant-selected services, such as those disclosed in the foregoing, and returns an enrollment result to the merchant system 105. Depending upon the enrollment result, the merchant system 105 may enroll the user by issuing to the user the user payment device 120 and associating the device to, for example, that user's debit account 130.

When the user desires to make a purchase from the merchant, the user presents the user payment device 120, and the merchant system 105 uniquely identifies the debit account 130. The merchant system 105 submits a purchase transaction request and submits the purchase transaction request to the transaction processor 115. The transaction processor 115 performs various merchant-selected services, such as those disclosed in the foregoing, and returns an authorization result to the merchant system 105. Depending upon the authorization result, the merchant system 105 may complete the purchase by providing the products to the user and informing the transaction processor 115 of the same. The transaction processor 115 then advantageously performs settlement through the issuance of one or more electronic ACH debit transactions to the clearinghouse system 125, thereby transferring funds from the debit account 130 to a credited account 135, such as, for example, the merchant's bank account.

According to embodiments where the user payment device 120 communicates through, for example, a wireless signal, the merchant system 105 may include a merchant receiver 140 designed to receive the foregoing communications.

Merchant System 105

According to one embodiment, the merchant system 105 includes the components be used to implement a system which uniquely identifies a debit account when a user presents payment devices other than paper checks or credit cards. For example, the merchant system 105 may include one or more central server systems 142, which can communicate with one or more merchant receivers 140, one or more user account databases 144 and with electronic documents 146. The user account databases 144 can store various user data including MICR data which can be used to identify the debit account 130, and the associated device identifier ("ID") the merchant system 105 will use to recognize the user payment device 120. For example, as described in the foregoing with respect to enrollment, the user can provide MICR data from a check that corresponds to the account from which funds are to be drawn, such as, for example, the debit account 130. The MICR data can include a routing or bank transit number, generally identifying the financial institution or groups of financial institutions that issued the original user's check, an account number against which the original check is drawn, a check sequence number, various separator symbols often unique to the financial institution, and the like. In addition, the MICR data can indicate whether the check is a company check or a personal check. The device ID can include an identification number or account number which uniquely identifies each user's debit account 130, which may also be used by the server 142 to index other data in the user account databases 144.

The user account database 144 may also include user enrollment data, such as the name, email, address, login identifier, password, or the like of each user. The information may also include historical data fore each user, such as transactions, purchases, payments, risk scores, credit histories or other financial information, public record data, or the like.

Although the user account database 144 is disclosed with reference to one embodiment, a skilled artisan will recognize from the disclosure herein that the database can be one or more remote or local database systems, or the like.

In an embodiment where the enrollment system 110 includes the use of a computer network, such as the Internet, the server 142 can also include a web server accessing the electronic documents 146. The server 142 generally processes requests for the documents 146, retrieves the documents 146, performs any necessary processing, and sends the documents 146 to the requesting computer system via the computer network. The documents 146 can be used to generate the electronic enrollment pages, user pages helpful in managing user accounts, or the like. Moreover, the documents 146 can be used to generate a variety of pages, such as search and other navigational pages, login, authentication, and authorization pages, online stores, and so forth.

Although the merchant system 105 is disclosed with reference to one embodiment of Internet enrollment, the invention is not intended to be limited thereby. Rather, an artisan will recognize from the disclosure herein a wide number of alternative systems providing user enrollment, such as, for example, user enrollment via the mail, a telephone call, a facsimile, or the like. Often, the enrollment vehicle options are limited by rules of the financial institutions governing portions of the transaction, such as, for example, rules generated by the National Automated Clearing House Association ("NACHA") or by the national ACH network. Additional information on the processes employed by the ACH, rules of the NACHA, the process of clearing paper checks and applying predictive scoring algorithms for risk assessment, can be found in U.S. Pat. No. 5,679,940, issued to Templeton et al. on Oct. 21, 1997, entitled "Transaction System With On/Off Line Risk Assessment," which is incorporated herein by reference, and is generally considered with the scope of knowledge possessed by one of ordinary skill in the banking community.

In addition, the merchant system 105 can include or comprise any device that interacts with or provides data to the merchant receiver 140, the user enrollment system 110, or the transaction processor 115, including by way of example, any Internet site, private networks, network servers, video delivery systems, audio-visual media providers, television programming providers, telephone switching networks, teller networks, wireless communication centers or the like.

Moreover, the merchant system 105 may include one or more satellite or store computer systems throughout a geographically diverse network. Each store system may be located within proximity to a merchant receiver, and may advantageously communicate with one or more servers or the server system 142 to access user information stored in one or more database collections, such as, for example, the user account database 144.

User Enrollment System 110

FIG. 1 also shows the transaction processing system 100 comprising the user enrollment system 110. According to one embodiment, the user enrollment system 110 comprises one or more computer systems allowing a user to interact with the merchant system 105 via a communication link. In one embodiment, the computer is equipped with a modem or other communication device configured to communicate with aspects of the merchant system 105. The computer may comprise, by way of example, processors, program logic, or other substrate configurations representing data and instructions, which operate as described herein. In other embodiments, the processors can comprise controller circuitry, processor circuitry, processors, general purpose single-chip or multi-chip microprocessors, digital signal processors, embedded microprocessors, microcontrollers and the like. In addition, the user enrollment system 110 can comprise a computer workstation, a local area network of individual computers, a kiosk, a point-of-sale device, a personal digital assistant, an interactive wireless communications device, an interactive television, a transponder, or the like.

In one embodiment, the user employs the user enrollment system 110 to enroll with the merchant system 105. For example, the merchant system 105 may advantageously present an electronic enrollment form to the user through the user enrollment system 110. The enrollment form can include an entry for data associated with the debit account the user wishes to tie to the payment device 120, such as, for example, MICR data from an unused check. According to one embodiment, the enrollment form may also include an explicit authorization from the user, authorizing the merchant, the processor, or both, to generate electronic debits and credits from a selected user debit account.

When the user has completed the enrollment form, the user enrollment system 110 transfers the entered information to the merchant system 105, where it is stored, for example, in the user account database 144. An exemplary enrollment process is disclosed with reference to FIG. 3.

Although the enrollment system 110 is disclosed with reference to an embodiment of Internet enrollment, the invention is not intended to be limited thereby. Rather, as disclosed, a wide number of alternative systems can provide user enrollment, such as, for example, user enrollment via the mail, a telephone call, a facsimile, or the like. Often, the enrollment vehicle options are limited by rules of the financial institutions governing portions of the transaction, such as, for example, rules generated by NACHA for the national ACH network.

FIG. 1 also shows the merchant system 105 including server code 148. The server code 148 advantageously includes one or more software processes or program logic designed to execute on the server systems 142. In one embodiment, the server code 148 may advantageously include software or hardware components such as software object-oriented components, class components and task components, processes methods, functions, attributes, procedures, subroutines, segments of program code, drivers, firmware, microcode, circuitry, data, databases, data structures, tables, arrays, and variables. As illustrated in FIG. 1, the server code includes enrollment process code for enrolling users into the transaction processing system 100, and purchase process code for allowing users to purchase products by presenting their user payment devices 120.

Transaction Processor 115

According to one embodiment, the transaction processor 115 comprises one or more server systems 152 communicating with one or more database collections to determine whether to authorize particular transactions presented by the merchant system 105. The database collection can comprise one or more logical and/or physical data storage systems for storing the data used by the transaction processor 115, and may comprise two or more separate databases and/or storage systems or networks of storage systems.

As shown in FIG. 1, the database collection comprises a historical transaction database 154, and a MICR line conversion database 156. The historical transaction database 154 advantageously stores information about the users' financial history, and may include transaction data from transactions processed by the transaction processor 115, other systems, credit reporting companies, or other commercially available databases. The historical transaction database 154 can include information from, for example, credit reports, online activities by the user, other user data, or the like. The historical transaction database 154 can comprise multiple databases, such as, for example, a positive database storing positive risk information, and negative databases storing high-risk information or names of otherwise unqualified individuals.

The MICR line conversion database 156 includes information regarding the formatting of transactions submitted to the clearinghouse system 125. For example, the MICR line conversion database 156 can include historical and other information regarding the placement and use of differing MICR character by various banking institutions or check printing companies, thereby providing the transaction processor 115 with conversion information for converting the user entered checking account data, such as the MICR line, into, for example, electronic ACH debit or credit transactions. The MICR data and/or historical data stored in the MICR line conversion database 154 can also include routing numbers, account or check number, payable through credit institutions, traditionally absent numbers, or the like.

FIG. 1 also shows the transaction processor 115 including server code 158. The server code 158 advantageously includes one or more software processes or program logic designed to execute on the server systems 152. In one embodiment, the server code 158 may advantageously include software or hardware components such as software object-oriented components, class components and task components, processes methods, functions, attributes, procedures, subroutines, segments of program code, drivers, firmware, microcode, circuitry, data, databases, data structures, tables, arrays, and variables.

As shown in FIG. 1, the server code 158 includes transaction process code, and enrollment and purchase processing code. The transaction process code advantageously performs various merchant selected services, such as, for example, user data validation, negative and/or positive database searching, risk scoring, account information validation, settlement processing, or the like. The transaction process code also returns enrollment and authorization results. As disclosed, various information within the authorization result may depend on whether the transaction processor will act as a guarantor for the payment transaction. As disclosed, the authorization result can include advice or instructions on whether to an accept or decline the payment transaction, a risk score to inform the merchant of a risk associated with accepting the transaction, a result of a negative and/or database search, or the like.

User Payment Device 120

As disclosed in the foregoing, the user payment device 120 allows users to make purchases by presenting the device 120 to the merchant system 105, and having the appropriate funds withdrawn from the debit account 130. According to one embodiment, the user payment device 120 can comprise a wide variety of point-of-sale payment devices. For example, the user payment device 120 can comprise radio or other frequency transponders, such as toll transponders designed to automatically communicate with tollbooths, thereby avoiding the need to stop and pay cash to use a toll road. The user payment device 120 may comprise transponders designed to communicate with gas stations for the payment of fuel at the pump. Transponders may be used to conveniently pay for drive through services, grocer checkout counters, or virtually any place where payment through a wireless device makes for convenient, efficient, purchases. According to one embodiment, the user payment device 120 can comprise a computing device, a personal digital assistant, a wireless telephone or the like. Moreover, according to one embodiment, the user payment device 120 transmits various data when it detects the presence of a receiver for the same. Other embodiments may include the ability to receive data from or otherwise communicate with, for example, the merchant system 105.

According to another embodiment, the user payment device 120 may comprise loyalty cards such as those used by many grocers, or the like. In such embodiments, the user payment device 120 may include a magnetic stripe and/or number designed to uniquely identify the debit account 130. According to yet another embodiment, the user payment device 120 may comprise biometric solutions such as those used by quick serve restaurants including thumbprints, facial recognition, or the like. Other embodiments include electronic wallets, one or more smart cards, or the like.

As disclosed in the foregoing, the user payment device 120 can advantageously be associated with the merchant, and therefore, can often generate loyalty in customers as they desire to use their device instead of carrying cash or using expensive credit card technologies.

Clearing House Network 125

According to one embodiment, the clearinghouse system 125 comprises the national ACH network. Generally, the ACH network can accept electronic ACH debit and credit transactions against, for example, the user's debit account 130. When the transaction processor 115 settles a transaction between the user and the merchant, the transaction processor 115 advantageously formats at least one electronic ACH debit transaction debiting the user's debit account 130, and crediting the credited account 135. The foregoing electronic ACH debit and credit transactions are then transferred into the national ACH network as electronic transactions. Rules for the format and content of the electronic ACH debit and credit transactions are governed by NACHA and considered within the scope of knowledge for an artisan within the electronic banking industry.

Although the clearinghouse system 125 is disclosed with reference to this embodiment, the invention is not intended to be limited thereby. Rather, a skilled artisan will recognize from the disclosure herein a wide number of alternatives for the clearinghouse system 125. For example, the clearinghouse system 125 may comprise one or more private institutions that have developed a network for clearing electronic transactions between users thereof. Such private systems generally promulgate rules governing the type and content of electronic transaction submissions.

Merchant Receiver 140

FIG. 1 also shows the transaction processing system 100 including the merchant receiver 140. The merchant receiver 140 communicates with, or receives the transmission from, the user payment device 120. The merchant receiver 140 may be a toll receiver designed to automatically read a toll transponder of a motorist, may be a receiver designed to read a transponder waved in front of, for example, a fuel pump, or the like. According to one embodiment, the receiver 140 communicates with the merchant system 105 to uniquely identify the user, the user's checking account data, biometric readers or scanners, or the like.

Other embodiments may include a magnetic stripe reader or other system designed to read the information found on loyalty cards or the like.

Communication Links

FIG. 1 also illustrates various components communicating with one another through communication links. In one embodiment, the communications links include portions of the Internet, which is a global network of computers. In other embodiments, the communications links may be any communication system including by way of example, telephone networks, wireless data transmission systems, two-way cable systems, computer networks, interactive kiosk networks, automatic teller machine networks, interactive television networks, and the like.

Based on the foregoing disclosure, the transaction processing system 100 advantageously provides users with the convenience of using the payment devices 120 instead of carrying cash or using expensive traditional card technologies. Moreover, the transaction processing system 100 advantageously provides merchants with the ability to select from many risk determining or risk guarantee services, while also allowing for automated processing through the clearinghouse system 125, which is generally significantly less expensive than the minimum fixed cost fees associated with the traditional card technologies.

Although the transaction processing system 100 has been disclosed with respect to various preferred and alternative embodiments, an artisan will recognize from the disclosure herein that a wide number of differing devices can accomplish the functionality disclosed. For example, the merchant system 105 and the transaction processor 115 may advantageously be governed by, and/or comprise a single entity or system. Moreover, layered gateway systems may offer users the ability to use the gateway's payment device in multiple retail locations of multiple merchants, without departing from the scope of the present disclosure.

Exemplary Enrollment Form

Figure 2:
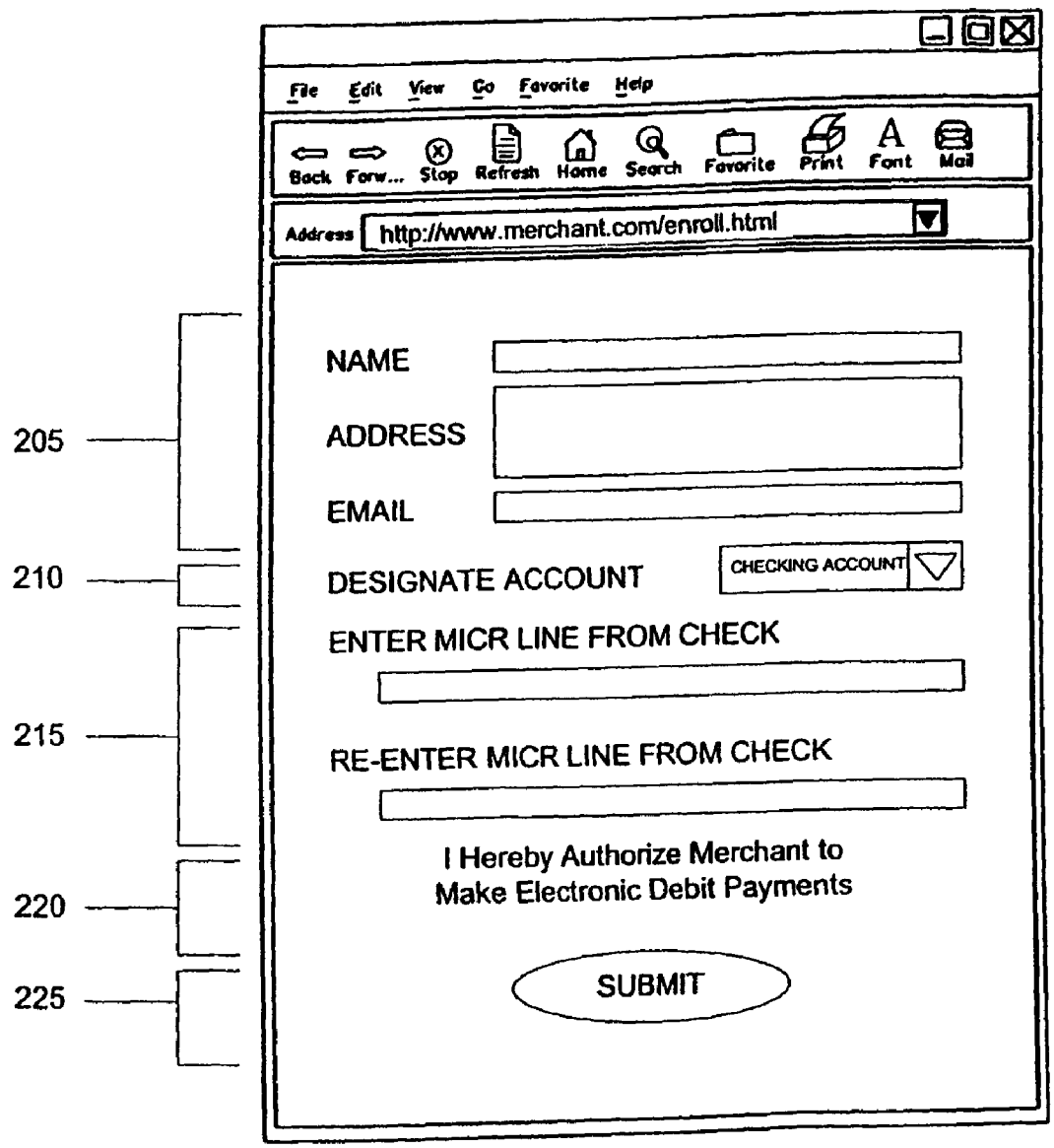
FIG. 2 illustrates an exemplary webpage used to enroll the user in the transaction processing system of FIG. 1, according to an embodiment of the invention.

FIG. 2 illustrates an exemplary webpage 200, which can be used to enroll the user into the transaction processing system 100, according to an embodiment of the invention. As shown in FIG. 2, the webpage 200 comprises user demographic information 205, such as name, address, email, age, social security number, gender, or other historical or demographic information desired by the merchant or processor to, among other things, develop accurate risk assessments of the user. The webpage 200 also includes an account selection button 210, providing the user the ability to associate, for example, payments from the user device 120, to the debit account 130. According to one embodiment, the user can select his or her checking account. According to other embodiments, the user may select a credit card or other financial accounts.

When the user desires to tie his or her payment device 120 to the debit account 130, the webpage 200 also includes an entry section for entry of debit account data 215. As shown in FIG. 2, the debit account data 215 can include MICR data from an unused check. According to one embodiment, the user may be prompted to enter an asterisk (*), or other placeholder character, in place of the non-numeric symbols that are included in many MICR characters printed on a check. Alternatively, the webpage 200 may include an interactive portion which allows users to select from a given set of non-numeric MICR symbols to be added to their MICR data. Other embodiments may include instructions on how to create and/or attach a scanned image of an unused check, or a file containing data from a MICR line optical and/or magnetic reader. In such embodiments, the merchant or the processor may incorporate hardware and/or software components designed to interact with such data to extract the MICR data, such as, for example, optical character recognition ("OCR") software, or the like. As shown in FIG. 2, the webpage 200 may request MICR data be entered twice, thereby advantageously allowing the merchant system 105 to compare each entry so as to ensure correct entry thereof.

Embodiments of the enrollment webpage 200 also include an authorization section 220, where the user explicitly authorizes the merchant system 105 and/or the transaction processor 115 to perform electronic ACH debit and credit transactions to his or her selected debit account. Such authorization may include a separate button indicating the user has read and understands the same, may have limitations such as a "not to exceed" limitation, or the like. In addition, the webpage 200 includes a submit button 225, which transfers the user-entered data from the user enrollment system 110 to the merchant system 105.

Although the webpage 200 is disclosed with reference to an exemplary embodiment, an artisan will understand from the disclosure herein that the webpage 200 may include a wide variety of interactive buttons, forms, updated electronic pages, menu selections, multimedia explanations or other presentations, or the like. Moreover, the webpage 200 may request that the user upload a digital picture or scanned image of the user or various user documents, such as a driver's license, social security card, government ID, or the like. In addition, the webpage may include one or more printable forms which a user can email, mail or fax to the merchant system 105.

As disclosed in the foregoing, the transaction processing system 100 can include a wide variety of other enrollment mechanisms, and the exemplary online enrollment form 200 is not meant to limit the scope of the disclosure.

Enrollment Process 300

Figure 3:
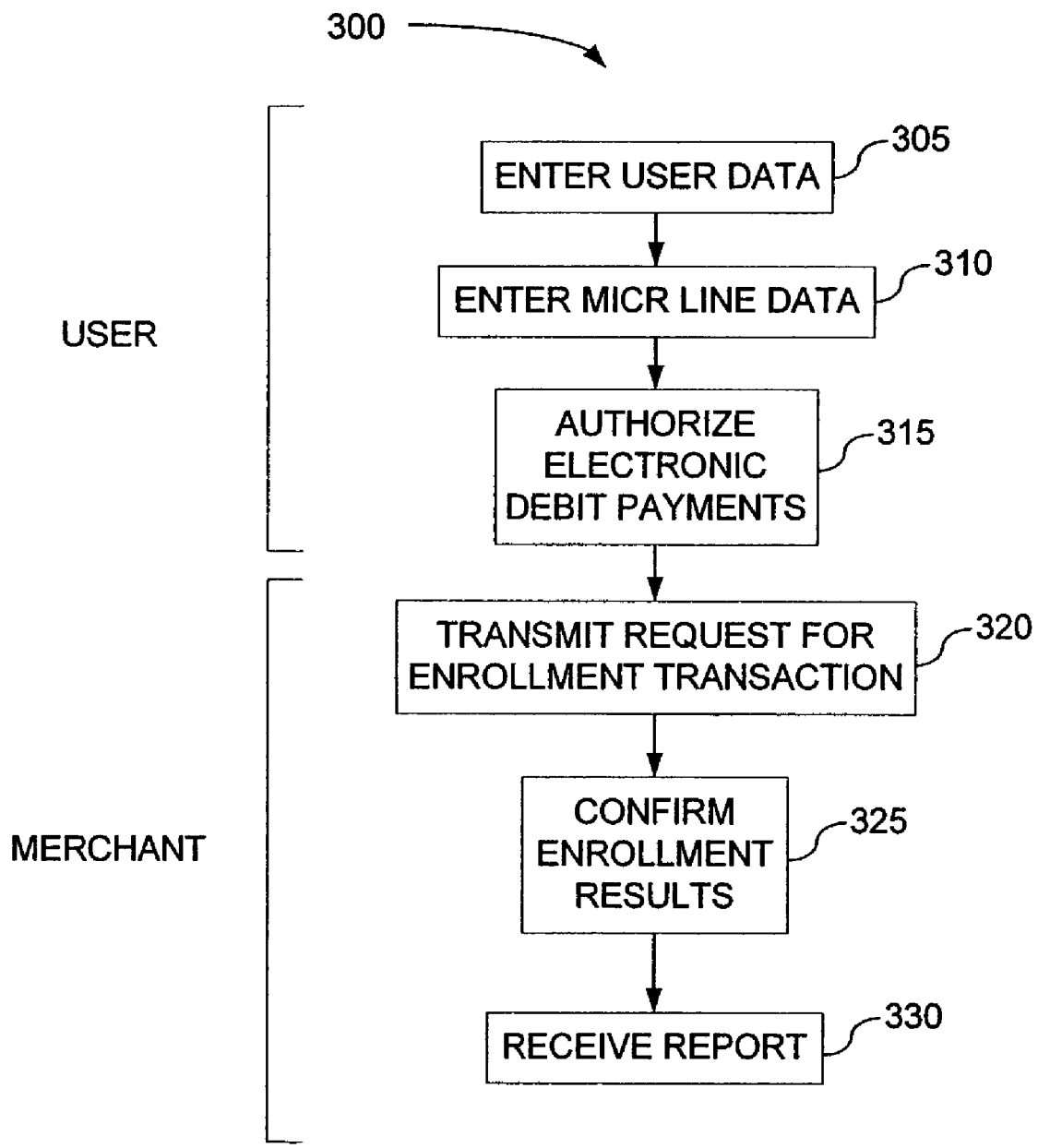
FIG. 3 illustrates an enrollment process, according to an embodiment of the invention.

FIG. 3 illustrates an enrollment process 300, according to an embodiment of the invention. As shown in FIG. 3, the enrollment process 300 generally includes the user transferring various demographic and account data to the merchant system 105, which in one embodiment, formats an enrollment transaction request to be processed by the transaction processor 115.

The exemplary enrollment process 300 begins at BLOCK 305, where the user enters the user data into the enrollment system 110. As described in the foregoing, the user data can include a user data can include a user name, address, social security number, email, government identification, corporate identification logins, passwords, biometric data such as a fingerprints or facial scans, driver's license information such as license number or the like, scans of some or all of the foregoing documents, outputs from magnetic stripe or other card readers, or other data helpful in assessing a risk associated with enrolling the user in the transaction processing system 100.

At BLOCK 310, the user enters MICR data from one of his or her checks associated with the debit account 130 from which funds can be drawn. As described in the foregoing, the MICR data can include MICR characters, such as an account number, the bank transit number, the check sequence number, type of check, and the like. According to embodiments disclosed in the foregoing, the MICR data may also include placement holder characters in place of the non-numeric symbols that are included in their MICR line, or the like. According to one embodiment, the MICR data read by a scanning or reading device and entered into the enrollment system 110.

At BLOCK 315, the user authorizes the merchant system 105 and the transaction processor 115 to submit electronic ACH debits against the debit account 130 when the user presents the user payment device 120 as payment for products. As disclosed in the foregoing, such authorization can be governed by rules promulgated by the clearinghouse system 125.

At BLOCK 320, the merchant system 105 organizes various user-submitted information into an enrollment transaction request, and submits the same to the transaction processor 115. The form and format of the enrollment transaction request can be designated or defined by the merchant system 105 and/or transaction processor 115, and according to one embodiment, can include information identifying the merchant, identifying the user, date and time information, information designating the user's account data, such as MICR data, merchant information, or the like. The enrollment transaction request may also include additional information useful in assessing the risk of the user, such as, for example, a driver's license or social security number, address, credit card data, or other demographic or financial data.

After the transaction processor 115 processes the enrollment transaction, such as, for example, according to various disclosed merchant-selected services, the transaction processor returns an enrollment result. According to embodiments disclosed herein, the enrollment result provides an indication to the merchant system 110 of the risk associated with accepting the enrollment of the user in the transaction processing system 100.

At BLOCK 325, the merchant system 105 confirms the receipt of that result, and can further instruct the transaction processor 115 to validate the enrolling user's account information. For example, the merchant system 105 may desire to ensure that the banks, financial institutions, or the like, associated with the debit account 130, support the submission of electronic ACH debit transactions. According to one embodiment, the merchant system 105 instructs the transaction processor 115 to format and submit an electronic ACH debit and credit for equal amounts against the debit account 130, thereby validating that the account information supports electronic ACH processing.

At BLOCK 330, the merchant system 105 receives the report from the transaction processor 115 detailing, for example, the results of the validation of account information, the risk associated with enrolling the user, permission to enroll the user in embodiments where the transaction processor 115 acts as a guarantor, one or more settlement files, or the like. Upon receipt of the report, the merchant system 105 can advantageously determine whether to enroll the user into the transaction processing system 100.

Based on the foregoing, the enrollment process 300 advantageously provides assurances to the merchant system 105 on whether the enrolling user is within an acceptable credit risk and whether the user-selected debit account 130 and associated banking institutions allow for electronic transactions through the clearinghouse system 125.

Although disclosed with reference to preferred and alternative embodiments, an artisan will recognize from the disclosure herein that the enrollment process 300 may advantageously include portions or all of the foregoing functionality, without departing from the spirit or scope of aspects of the invention.

Purchase Process 400

Figure 4:
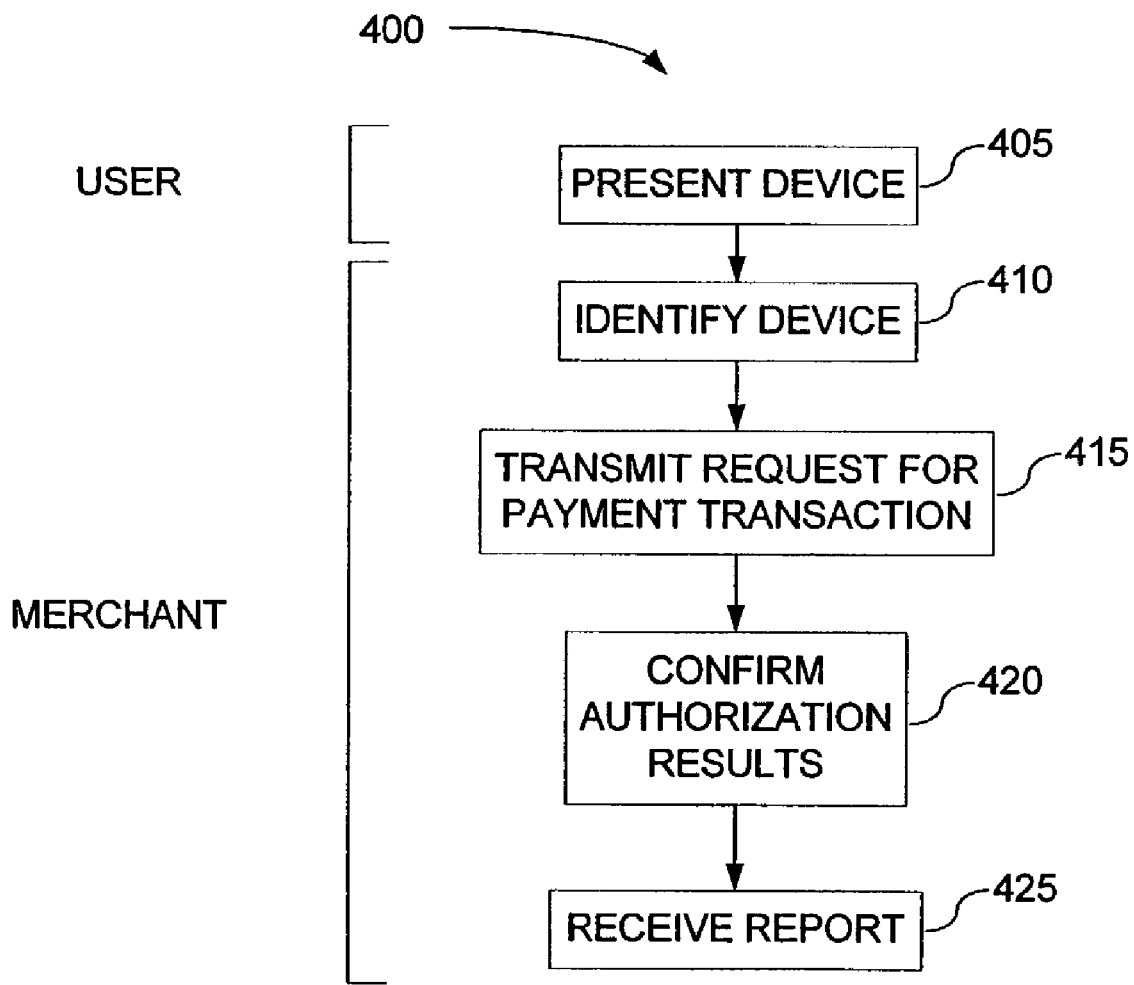
FIG. 4 illustrates a purchase process, according to an embodiment of the invention.

FIG. 4 illustrates a purchase process 400, according to an embodiment of the invention. As shown in FIG. 4, the purchase process 400 generally includes the user presenting the user payment device 120 to the merchant receiver 140 as payment for one or more products, where the payment is to be debited from the debit account 130. The merchant system 105 recognizes the payment device 120, determines the corresponding account information, and formats a purchase transaction request to be processed by the transaction processor 115. Based at least in part upon the processing by the transaction processor 115, the merchant system 105 will determine whether to allow the user to purchase the one or more products using the payment device 120.

The exemplary purchase process 400 begins at BLOCK 405, where the user presents his or her user payment device 120 to the merchant receiver 140 as payment for one or more products, where the payment is to be debited from the debit account 130. As disclosed in the foregoing, the presentment may be of a transponder, a loyalty card, a biometric, a smart card or the like, to a corresponding system designed to read sufficient information to uniquely locate the corresponding account information, such as, for example account information stored in the user account database 144. At BLOCK 410, the merchant system 105 identifies the user payment device 120, accesses the relevant account information, and formats a purchase transaction request to be processed by the transaction processor 115.

As described in the foregoing, the form and format of the purchase transaction request can be designated or defined by the merchant system 105 and/or transaction processor 115, and according to one embodiment, includes information identifying the merchant, identifying the user, date and time information, information designating the user's account data, such as MICR data, product information, amount of purchase, time of day, day of week, date, location of purchase, purchaser, cash back amount, type of payment device, and the like. The purchase transaction request may also include additional information useful in assessing the risk of the transaction, such as, for example, a user driver's license or social security number, address, credit card data, or other demographic or financial data.

After the transaction processor 115 processes the purchase transaction, such as, for example, according to various disclosed merchant-selected services, the transaction processor 115 returns an authorization result. According to embodiment disclosed herein, the authorization result provides an indication to the merchant system 105 of the risk associated with accepting the transaction. According to one embodiment, when the authorization result was positive, or within predetermined acceptable ranges of risk, the merchant system 110 can finalize the purchase with the user.

At BLOCK 420, the merchant system 105 confirms the receipt of the authorization result, and can further instruct the transaction processor 115 whether the purchase was finalized between the user and the merchant system 105. When the purchase was finalized the merchant system 105 confirms receipt of the authorization results and transmits an indication to the transaction processor 115 that the purchase was finalized and settlement should be processed.

According to one embodiment, the transaction processor 115 uses the MICR conversion data from the MICR conversion database 156, to translate the MICR data into that information desired by the clearinghouse system 125. The transaction processor 115 then formats and submits an electronic ACH debit, which includes the foregoing information, to the clearinghouse system 125.

Based on the foregoing, the purchase process 400 advantageously advises, and often guarantees that the purchase transaction is within an acceptable credit risk for the merchant. Moreover, the purchase process 400 performs settlement processing. Although disclosed with reference to preferred and alternative embodiments, an artisan will recognize from the disclosure herein that the purchase process 400 may advantageously include portions or all of the foregoing functionality, without departing from the spirit or scope of aspects of the invention.

Transaction Process

Figure 5:
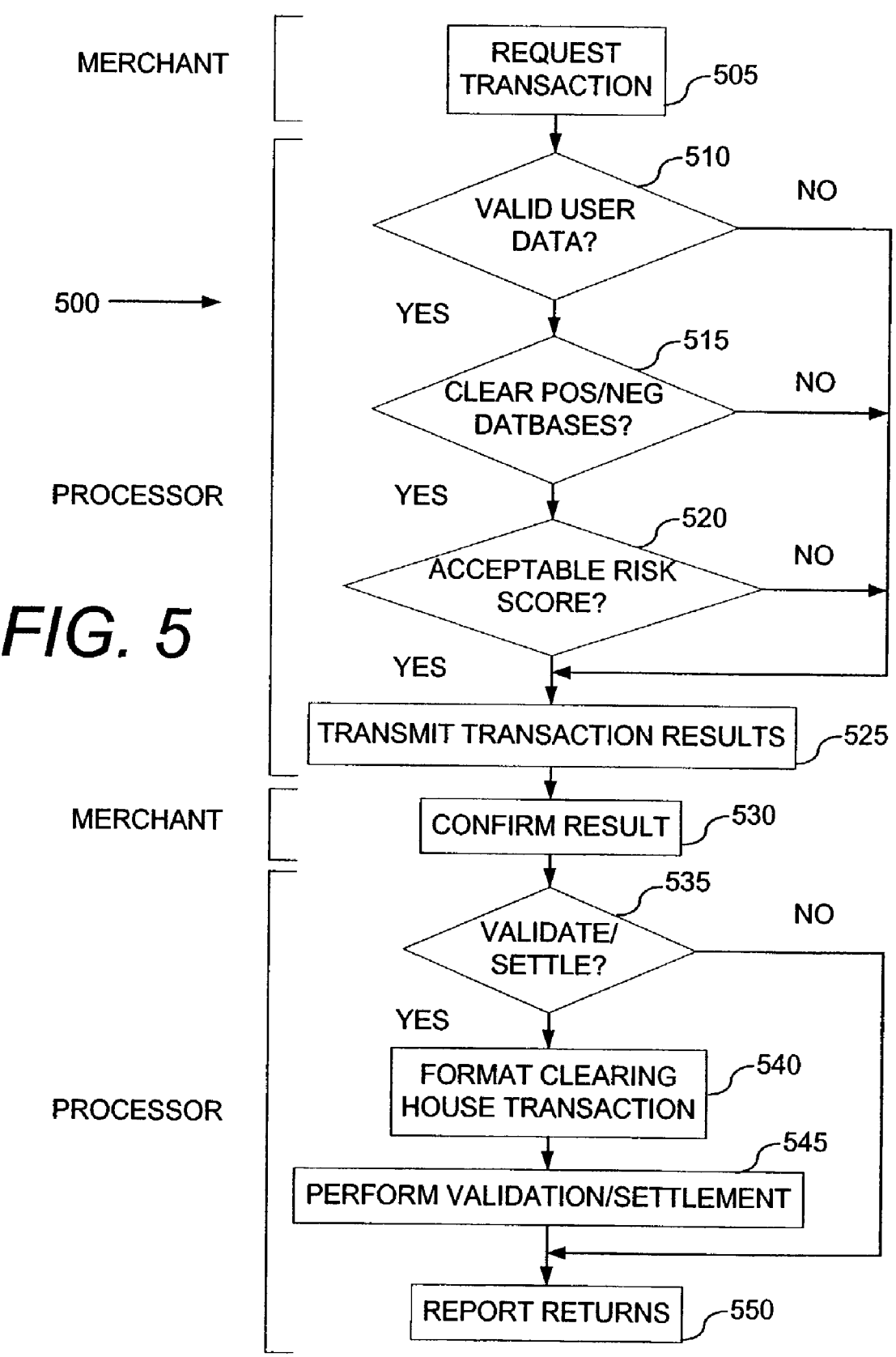
FIG. 5 illustrates a transaction processing process, according to an embodiment of the invention.

FIG. 5 illustrates a transaction processing process 500, according to an embodiment of the invention. As shown in FIG. 5, the transaction processing process 500 generally includes the transaction processor 115 receiving one of an enrollment transaction request or a purchase transaction request from the merchant system 105. Based on which services the merchant selected, the transaction processing process 500 performs various levels of risk assessment and, in some cases, may guarantee the transaction. Thus, according to one embodiment, the actions of the transaction processing process 500 will vary depending upon the service selections of the merchant. The transaction processing process 500 also can validate various account information and/or perform settlement processing through communication with the clearinghouse system 125.

According to one embodiment, the transaction processing process 500 begins at BLOCK 505 where the transaction processor receives one of an enrollment transaction request or a purchase transaction request from the merchant system 105. As described in the foregoing, when the merchant-selected services include one or more of user data validation, clearance of the negative and positive databases, assessment of risk scores, or the like, the transaction processor 115 performs those activities with respect to the information provided in the particular transaction request, as illustrated in BLOCKS 510-520 of FIG. 5.

At BLOCK 525, the transaction processor 115 transmits the results of the foregoing processing back to the merchant system 105. As described, at BLOCK 530, the merchant system 105 confirms the receipt of the transaction results, and instructs the transaction processor 115 to validate the account data associated with an enrollment transaction request, settle the purchase associated with a purchase transaction request, or the like.

When validation or settlement is desired, at BLOCK 540, the transaction processor formats the appropriate electronic ACH submissions by, for example, the conversion of the MICR data into information used by the clearinghouse system 125. For example, the transaction processor 115 performs settlement by debiting the debit account 130 by an amount corresponding to the purchase transaction amount. Moreover, the transaction processor 115 submits a credit of the foregoing amount, minus in one embodiment, the processor's fees, to the credited account 135. At BLOCK 545, the transaction processor 115 submits the electronic ACH debits or credits to the clearinghouse system 125. At BLOCK 550, the transaction processor 115 reports the results back to the merchant system 105.

As disclosed in the foregoing, the reports can advantageously include one or more settlement files corresponding to one or more transactions or batches of transactions having been just processed or processed some time before. Also as disclosed, when the transaction processor 115 acts as a guarantor for a particular transaction, the data related to that transaction in the settlement file is often then not subject to reversal.

Based on the foregoing, the transaction processing process 500 advantageously employs the clearinghouse system 125 to settle payments made using the payment device 120, or validate account data submitted at enrollment. The clearinghouse system 125 generally performs the settlement purchases faster, more reliably, and at a significantly lower rate than the fixed minimum and other fees of traditional credit cards. In similar fashion, the transaction processing system 100 disclosed in the foregoing advantageously adopts many of the conveniences for users and merchants of credit card payments, without incorporating the high costs of the same.

Although the foregoing invention has been described in terms of certain preferred embodiments, other embodiments will be apparent to those of ordinary skill in the art from the disclosure herein. Additionally, other combinations, omissions, substitutions and modifications will be apparent to the skilled artisan in view of the disclosure herein. While certain embodiments of the inventions have been described, these embodiments have been presented by way of example only, and are not intended to limit the scope of the inventions. Indeed, the novel methods and systems described herein may be embodied in a variety of other forms without departing from the spirit thereof. The accompanying claims and their equivalents are intended to cover such forms or modifications as would fall within the scope and spirit of the inventions.

In addition to the foregoing disclosure, all publications, patents, and patent applications, or other references mentioned in this specification are herein incorporated by reference to the same extent as if each individual document was specifically and individually indicated to be incorporated by reference.

What is claimed is:

1. A system for processing check transactions, the system comprising:
    an enrollment system that enrolls a user by associating a checking account with a transponder to allow the user to pay for charges on the transponder via the checking account wherein the enrollment system requests a risk analysis before enrolling the user;
    a merchant terminal that accepts identification information from the transponder as payment for goods or services, wherein the identification information does not contain MICR data and wherein the merchant terminal uses the identification information to determine appropriate MICR data indicative of a checking account based on a database including a record storing the identification information and MICR data associated with the identification information; and
    a transaction processor system, remote from the merchant terminal, that performs the risk analysis in response to the request from the enrollment system and accesses historical data associated with the MICR data from the merchant terminal to process a transaction from the merchant terminal, the processing based at least in part on the historical data, and wherein:
        the transaction processor system processing the transaction includes determining a risk assessment for the transaction;
        determining the risk assessment includes generating a risk score; and
        the merchant terminal authorizes or declines the transaction based at least in part on the risk score.

2. The system of claim 1, wherein the risk assessment includes searching negative data matching user data provided in the transaction.

3. The system of claim 1, wherein the risk score is reported to the merchant terminal.

4. The system of claim 1, wherein the risk score is compared to parameters and a result thereof is reported to the merchant terminal.

5. The system of claim 4, wherein the parameters are chosen by the merchant terminal.

6. The system of claim 1, wherein the transaction processor system processing the transaction includes validation.

7. The system of claim 6, wherein the validation includes submitting offsetting debits and credits to a clearinghouse system.

8. The system of claim 6, wherein the validation includes submitting at least one of a debit and a credit to a clearinghouse system.

9. The system of claim 1, wherein the transaction processor system processing the transaction includes settlement.

10. The system of claim 1, wherein the transaction processor system reports results of the transaction to the merchant terminal.

11. The system of claim 1, wherein the transaction processor system associates a risk with the transaction.

12. The system of claim 11, wherein information related to the risk is reported to the merchant terminal and a confirmation of the transaction is received from the merchant terminal before validation or settlement of the transaction.

13. A system comprising:
an enrollment system that enrolls a user by associating a checking account with a transponder device so that the user can pay for charges incurred by the transponder device with the checking account, wherein the enrollment system requests a risk assessment analysis on the user before enrolling the user;
a merchant terminal accepting identification information from the transponder device that the user presented as payment for goods or services being purchased, wherein the identification information does not contain MICR data and using the identification information to determine appropriate MICR data indicative of the checking account based on a database maintained by the merchant terminal and including a record storing the identification information and MICR data associated with the identification information; and
a transaction processor system:
performing the risk analysis in response to the request from the enrollment system;
converting the MICR data from the merchant terminal into electronic debits to be settled against the checking account through a clearinghouse system;
processing a transaction from the merchant terminal;
determining a risk assessment for the transaction, wherein determining the risk assessment includes generating a risk score, and wherein the merchant terminal, remote from the transaction processor system, authorizes or declines the transaction based at least in part on the risk score.

14. The system of claim 13, wherein the transaction processor system processes transaction requests including user data and the MICR data.

15. The system of claim 14, wherein the transaction processor system performs one or more risk assessments on at least some of the user data.

16. The system of claim 14, wherein the transaction processor system performs one or more validations on at least some of the user data.

17. The system of claim 14, wherein the transaction processor system performs one or more validations on at least some of the MICR data.

18. A method of processing check transactions of a user who presents a transponder associated with a checking account as payment for goods or services, the method comprising:
enrolling the user with an enrollment system by associating the checking account with the transponder so that the user can pay for charges incurred by the transponder with the checking account;
performing a risk assessment analysis on the user with the enrollment system before enrolling the user;
receiving at a merchant terminal a check transaction request comprising identifying information from the transponder when the user presents the transponder as payment for goods or services, wherein the identifying information does not contain MICR data;
determining, remotely from the merchant terminal, a risk assessment for the check transaction request, wherein determining the risk assessment includes generating a risk score;
authorizing the check transaction request, at the merchant terminal, based at least in part on the risk score;
determining with the merchant terminal appropriate MICR data associated with the identifying information, the MICR data indicative of a checking account and wherein determining the appropriate MICR data associated with the identifying information is based on a record of a database storing the identification information and the appropriate MICR data associated with the identification information;
converting the MICR data into at least a portion of an electronic debit with the merchant terminal;
submitting the electronic debit to a clearinghouse system with the merchant terminal; and
receiving at the merchant terminal confirmation indicating whether the electronic debit was properly settled.

19. A method of processing transponder-initiated check transactions, the method comprising:
enrolling a user with an enrollment system by associating the user's checking account with a transponder device so that the user can pay for charges incurred by the transponder device with the user's checking account;
performing a risk assessment analysis on the user with the enrollment system before enrolling the user;
receiving at a merchant terminal a transponder-initiated check transaction including an amount and identification information, the identification information associated with the transponder, wherein the identification information does not contain MICR data;
assessing, remotely from the merchant terminal, a risk score associated with authorizing the transponder-initiated check transaction;
authorizing the transponder-initiated check transaction, at the merchant terminal, based at least in part on the risk score;
associating the identification information with MICR data indicative of the user's checking account in the merchant system based on a database maintained by the merchant terminal and including a record storing the identification information and MICR data associated with the identification information;
formatting an electronic debit with the merchant terminal based on the MICR data and the amount; and
submitting the electronic debit with the merchant terminal to a clearinghouse system.

20. The method of claim 19, further comprising validating some or all of user data provided in the transponder-initiated transaction.

21. The method of claim 19, further comprising guaranteeing payment of the transponder-initiated transaction.

22. The system of claim 1, wherein the risk score comprises a range of values.

23. The system of claim 1, wherein the risk score comprises a range of values which indicate differing probabilities that the transaction will result in a successful transfer of funds.

* * * * *